Patented Feb. 22, 1949

2,462,633

UNITED STATES PATENT OFFICE 2,462,633

ANIMAL FEED

Myers F. Gribbins, Wilmington, Del., assignor to E. I. du Pont de Nemours & Company, Wilmington, Del., a corporation of Delaware No Drawing. Application April 5, 1946,
Serial No. 659,880

8 Claims. (Cl. 99—2)

This invention relates to the stabilization of animal feed and more particularly to the stabilization of cattle feed.

Many natural and prepared feeds for animals and especially those that contain appreciable amounts of cereal meals tend to rancidify on storage. This rancidity problem is believed to be caused by a chemical reaction between free oxygen and fats present in the feed and results in the production of objectionable odors and flavors in the animal feeds. In addition, rancid fats are known to hasten the break down of vitamin E, which is a very important vitamin in animal feeds. Chemical drying and other treatments to prevent deterioration have been seriously considered but no wholly satisfactory solution of the problem has been described in the literature.

An object of the present invention is to provide a treatment for animal feeds whereby oxidative spoilage is inhibited. Another object is to provide antioxidants for the treatment of animal feed and more particularly cattle feed which will on the one hand maintain the whosesomeness of the feed for relatively long periods of time and on the other inhibit the development of oxidized odors in the milk from animals fed therewith. A further object of the invention is to provide a process for the treatment of feeds with non-toxic oxidation antioxidants and the feed so stabilized. Other objects and advantages of the invention will hereinafter appear.

The invention involves treating animal feed with a certain group of chemicals that have the peculiar and surprising innate ability to accomplish the aforesaid objects. These antioxidants are incorporated in small amounts throughout the feed during or after its preparation and when so treated the feed may be stored for periods of time considerably longer than the untreated feed. The treatment of the feed results in a two-fold function one of which is the inhibition of oxidative deterioration, the other a remarkable effect on the milk from milk-producing animals. The first function is characterized by a feed which is more palatable and more acceptable to the animal for a longer period of time than feed not so treated, the second function is characterized by a milk which has had imparted to it the remarkable property of stability shown particularly by the increase in time before the development of oxidation flavors. Moreover, dried milk and other milk products made from milk of animals that have been treated with the aforesaid stabilized feeds, are likewise improved in their ability to stand up during storage. Dried milk, for example, has been found to remain free from oxidation odors for months after its manufacture, when prepared from milk of this character.

The animal feeds are treated, in order to realize the remarkable results of this invention, with a substituted beta-mercaptopropionic acid, or ester by which is meant compounds containing the group $ROOCCH_2CH_2S—X$, in which R is hydrogen, an alkyl, aryl, aralkyl or alicyclic group and in which the monovalent substituent X of the sulfur group is a hydrocarbon. The formula represents such compounds as 3-Y mercaptopropionic acid in which Y is a methyl, ethyl, propyl, butyl, lauryl, phenyl, benzyl, naphthyl, (p-methoxy) phenyl, (p-hydroxy) phenyl, cyclohexyl group or the like; is an oxygenated-hydrocarbon group such as hydroxymethyl, hydroxyethyl, hydroxypropyl, methoxymethyl, ethoxyethyl, or the like; a sulfur-hydrocarbon group such as mercaptoethyl, mercaptopropyl, mercaptohexyl or the like; and oxygenated-hydrocarbon group illustrated by the compounds 3-hydroxymethyl mercaptopropionic acid

$(HOOCCH_2CH_2SCH_2OH)$ 3-hydroxyethyl mercaptopropionic acid

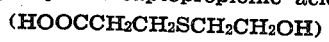
$(HOOCCH_2CH_2SCH_2CH_2OH)$ 3-hydroxypropyl mercaptopropionic acid

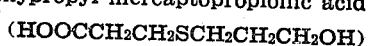
$(HOOCCH_2CH_2SCH_2CH_2CH_2OH)$ 3-methoxymethyl mercaptopropionic acid

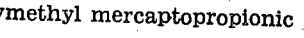
$(HOOCCH_2CH_2SCH_2OCH_3)$ 3-carboxyethyl mercaptopropionic acid

$(HOOCCH_2CH_2SCH_2CH_2COOH)$ or the like.

The above hydrocarbon, alcohol, ether, aldehyde, acid, ester, and other derivatives of beta-mercaptopropionic acids as well as the acid itself are excellent inhibitors of oxidation and the resultant development of off-odors or rancidity of the feed. The methyl, ethyl, propyl, butyl, lauryl, myristyl, cetyl, stearyl, and other straight and branch chain or cyclic esters of the acids may be used. These agents may be incorporated by any suitable method such, for example, as by spraying a solution of the agent on the material being treated.

It has been found satisfactory to prepare a solution of the antioxidant in a volatile solvent. The solution may contain from 1 to 50% of the antioxidant although the percentage appears to be not particularly critical. The resulting solution is sprayed on the feed, the product thoroughly mixed to insure uniform distribution and the solvent evaporated. Volatile solvents for this purpose may be the ketones, low boiling alcohols, naphthas, halogenated hydrocarbons and other low boiling solvents for the inhibitors. Contrariwise, the antioxidant may be emulsified in water or a low boiling non-solvent of the antioxidant by means of a suitable dispersing agent and the dispersion sprayed on the feed which may be subsequently dried to remove the water or non-solvent added. Other methods of adding the antioxidants may be used if desired, for example, by aerosol sprays and the like, the primary purpose being to effect a thorough and uniform distribution of the antioxidant throughout the feed.

The amount of antioxidant to be left on the feed may vary between 0.01 and 2% of its total weight and preferably between 0.05 and 1%, the higher values being used in those cases where the feed has a marked tendency to oxidize on standing.

The surprising and unexpected ability of these agents to inhibit degradation of feeds is indicated in these examples:

Table I

| Feed | Treatment | Days' Storage at 50° C. before detection of Rancid Odors |
|---|---|---|
| Corn #1 | None | 6 |
| Do | 0.01% TDP [1] acid | 7 |
| Do | 0.05% TDP acid | 84+ |
| Do | 0.05% "dilauryl" TDP | 81+ |
| Do | 0.10% "dilauryl" TDP | 84+ |
| Do | 0.20% "dilauryl" TDP | 84+ |
| Corn #2 | None | 29 |
| Do | 0.10% TDP acid | 83+ |
| Do | 0.30% "dilauryl" TDP | 83+ |
| Do | 0.10% TDP acid+0.30% "dilauryl" TDP. | 83+ |
| Wheat #1 | None | 28 |
| Do | 0.10% TDP acid | 31 |
| Do | 0.30% "dilauryl" TDP | 81+ |
| Do | 0.10% TDP acid+0.30% "dilauryl" TDP. | 81+ |
| Wheat #2 | None | 9 |
| Do | 0.10% TDP acid | 28 |
| Do | 0.30% "dilauryl" TDP | 81+ |
| Do | 0.10% TDP acid+0.30% "dilauryl" TDP. | 81+ |
| Wheat #3 | None | 15 |
| Do | 0.10% TDP acid | 81+ |
| Do | 0.30% "dilauryl" TDP | 81+ |
| Do | 0.10% TDP acid+0.30% "dilauryl" TDP. | 81+ |
| Bran #1 | None | 28 |
| Do | 0.10% TDP acid | 81+ |
| Do | 0.30% "dilauryl" TDP | 45 |
| Do | 0.10% TDP acid+0.30% "dilauryl" TDP. | 81+ |

[1] Thiodipropionic or 3-carboxyethyl mercaptopropionic.

A most surprising and unusual discovery was made that milk from animals which had been fed with the above treated feeds was stabilized against oxidation odors and accordingly had better storing characteristics when compared with milk from animals when the feed contained no antioxidant. This effect on the milk results from feeding fodder, ensilage, grain, concentrate or other animal feed with the above-designated amounts of the antioxidant. The milk obtained from an animal so fed may or may not contain determinable amounts of the inhibitor; but nevertheless, the milk as well as milk products made therefrom are inhibited against the development of oxidized odors.

Table II describes the effectiveness of feeding a cow with a diet of cow feed concentrate containing approximately 1% dilauryl thiodipropionate which was fed over a period of 23 days, this feed being supplemented by an ample supply of untreated hay. The antioxidant did not influence in any way the volume of milk production or its butter fat content and, moreover, the flavor of the milk was normal. From the table it will be seen that the milk produced during the period of treatment was significantly more resistant to the development of oxidized flavors. Under refrigerator storage conditions the milk from treated feed became oxidized in seven days as compared with 5 days for untreated samples. Whole milk powder likewise was remarkably benefited by this treatment for such powder prepared from the milk obtained from a treated cow was free from oxidation 3 to 4 times as long as samples from an untreated cow.

Table II

| Sample No. | | Laboratory Treatment | Storage Data | | | |
|---|---|---|---|---|---|---|
| | | | Fluid Milk at 42° F. | | Whole Milk Powder at 122° F. | |
| | | | Days to oxidized flavor | Days to sourness | Days to oxidized flavor | Days to rancidity |
| A | Control | None | 5 | 6 | 14 | 22 |
| B | do | do | 5 | 6 | 14 | 20 |
| B—a | do | 0.5% (fat basis) "Dilauryl" TDP | 7 | 8 | 73+ | 73+ |
| C | do | None | | 3 | 14 | 18 |
| C—a | do | 0.5% (fat basis) "Dilauryl" TDP | | 3 | 70+ | 70+ |
| D | do | None | | 6 | 14 | 18 |
| E | do | do | | 7 | 14 | 17 |
| F | do | do | 5 | 7 | 13 | 19 |
| G | Treatment | do | 7 | 8 | 45 | 50 |
| H | do | do | 8 | 9 | 73+ | 73+ |
| I | do | do | | 10 | 71+ | 71+ |
| J | do | do | 9 | 10 | 68+ | 68+ |
| K | do | do | 5 | 6 | 67+ | 67+ |
| L | do | do | | 9 | 65+ | 65+ |
| M | do | do | | 5 | 61+ | 61+ |
| N | do | do | 10 | 12 | 59+ | 59+ |
| O | do | do | 6 | 8 | 57+ | 57+ |
| P | do | do | 7 | 8 | 56+ | 56+ |
| Q | do | do | 5 | 8 | 2 | |

TDP—thiodipropionate or 3-carboxy ethyl mercaptopropionate.

During the above treatment the animal was isolated and maintained on a diet of commercial cow feed concentrate of about 8 lbs. daily and ample hay. Milkings were made twice daily and on alternate days samples of the morning milk were taken for observation and storage. The unpasteurized milk was stored at 42° F. and the flavor noted daily. Whole milk powder was prepared from these milks by roller drying and stored at 120° F. in open glass vessels to accelerate the development of oxidized flavor and rancidity.

The cow feed concentrate consumed during the treatment period was impregnated with dilauryl thiodipropionate by spraying the molten ester on a thin layer of feed followed by remixing giving a feed concentrate containing about 1% by weight of the ester.

In order to ascertain if the antioxidant with which the feed was treated was present in the milk of the animal on the treated feed diet, the milk was chemically analyzed and typical samples were found to contain from 0.016 to 0.019 percent of the antioxidant. The remarkable advantages derived from treating the feed not only result in improving and stabilizing the feed but also stabilizing the milk produced.

The invention involves inter alia these processes: stabilization of animal feed; stabilization of animal feed with compounds containing the mercaptopropionyl group; stabilization of milk by feeding animals with the aforesaid treated feeds; and these products: stabilized animal feeds, such feeds stabilized with compounds containing the mercaptopropionyl group, stabilized milk, and stabilized milk products.

I claim:
1. Animal feed containing from 0.01 to 1.0% of a 3-hydrocarbon substituted beta-mercaptopropionic acid.
2. Animal feed containing from 0.01 to 1.0% of a 3-alkyl beta-mercaptopropionic acid.
3. Animal feed containing from 0.01 to 1.0% of thiodipropionic acid.
4. Animal feed containing from 0.01 to 1% of an ester of thiodipropionic acid.
5. Animal feed containing from 0.01 to 2% of a compound of the group consisting of acids containing a beta-mercaptopropionyl group and esters containing a beta-mercaptopropionyl group.
6. A process of inhibiting the oxidative deterioration of animal feed which comprises incorporating therein from 0.01 to 1% of a compound of the group consisting of acids containing a beta-mercaptopropionyl group and esters containing a beta-mercaptopropionyl group.
7. Wheat containing from 0.01 to 2% of a compound of the group consisting of acids containing a beta-mercaptopropionyl group and esters containing a beta-mercaptopropionyl group.
8. Wheat containing from 0.01 to 1% of an ester of thiodipropionic acid.

MYERS F. GRIBBINS.

REFERENCES CITED

The following references are of record in the file of this patent:

FOREIGN PATENTS

| Number | Country | Date |
| --- | --- | --- |
| 102,824 | Australia | 1938 |